United States Patent [19]
Johnson

[11] Patent Number: 4,579,656
[45] Date of Patent: Apr. 1, 1986

[54] LEAF-TYPE FILTER

[76] Inventor: Willard L. Johnson, 12923 Lincoln Ave., Huntington Woods, Mich. 48070

[21] Appl. No.: 695,473

[22] Filed: Jan. 28, 1985

Related U.S. Application Data

[63] Continuation-in-part of Ser. No. 460,288, Jan. 24, 1983, Pat. No. 4,519,903.

[51] Int. Cl.⁴ ............................................. B01D 29/04
[52] U.S. Cl. .................................... 210/234; 210/335; 210/339; 210/346
[58] Field of Search ............... 210/314, 340, 341, 346, 210/347, 232, 339, 234, 335

[56] References Cited
U.S. PATENT DOCUMENTS

| | | | |
|---|---|---|---|
| 1,407,763 | 2/1922 | Langston | 210/234 |
| 2,547,205 | 4/1951 | Hallander | 210/346 |
| 3,004,669 | 10/1961 | Ulrich | 210/335 X |
| 3,330,415 | 7/1967 | Wilke et al. | 210/346 X |
| 3,474,911 | 10/1969 | Olsen | 210/346 X |
| 3,499,535 | 3/1970 | Zievers et al. | 210/346 X |
| 3,559,809 | 2/1971 | Barmore | 210/340 X |
| 4,116,838 | 9/1978 | Lazzarotto | 210/346 X |
| 4,303,518 | 12/1981 | Grosshandler | 210/346 X |

*Primary Examiner*—Thomas Wyse
*Attorney, Agent, or Firm*—Basile, Weintraub & Hanlon

[57] ABSTRACT

A leaf-type filter system in which a suction pump is employed to pump filtered fluid from a series of individual filter leaves is connected to the individual leaf chambers via fluid couplings located above the surface of fluid being filtered. The couplings are of inverted U-shape and have a sliding sealing fit with the vertical outlet tube of a leaf and a vertical receiving tube mounted in a manifold or header external of the main filter tank.

7 Claims, 4 Drawing Figures

LEAF-TYPE FILTER

This application is a continuation-in-part of my copending application Ser. No. 06/460,288, filed Jan. 24, 1983, now U.S. Pat. No. 4,519,903.

BACKGROUND OF THE INVENTION

The present invention relates to improvements in leaf-type filtering systems. In the leaf-type filtering system disclosed in my aforementioned parent application Ser. No. 06/460,288, as is typically true in prior art leaf-type filters, filtrate from each individual leaf is conducted from the leaf by a conduit extending from the bottom of the leaf to a manifold or header passing beneath the leaves.

The individual filter leaves must be removed for cleaning or replacement from time to time. The point of fluid connection between the leaf outlet pipe and the header or manifold is well below the surface of the unfiltered liquid contained in the tank and for all practical purposes is inaccessible to the operator. It is thus necessary to provide a coupling between the leaf outlet pipe and header which (1) can be mechanically released simply by vertical lifting of the filter leaf and (2) will promptly and automatically seal the header portion of the coupling upon removal of the associated filter leaf. If the header is not immediately sealed, dirty fluid from the tank will flow into the header to become mixed with the clean filtered fluid contained in the header. The coupling, of course, must also be capable of being made and sealed simply by vertical engagement of the outlet pipe of the replacement filter leaf, as the operator cannot clearly see this point of connection while he is trying to make it.

The present invention eliminates the need for a self-closing, subsurface coupling between the filter leaf and header and also provides a filter leaf construction and coupling arrangement in which the leaves themselves mutually locate and support each other within the filter tank.

SUMMARY OF THE INVENTION

In accordance with the present invention, identical individual filter leaves are formed in a rectangular configuration of relatively narrow lateral thickness. Along one vertical side edge of the leaf, a cylindrical coupling tube is mechanically attached to the core of the leaf and is in fluid communication with the internal chamber defined by the leaf core to constitute the outlet tube for conducting filtrate from the leaf. The outlet tube projects upwardly above the horizontal upper surface of the rectangular lead and, when located in the filter tank, the upper end of the outlet tube will project above the surface of fluid to be filtered contained in the tank.

The diameter of the leaf outlet tube is made larger than the lateral thickness of the leaf. The interchangeable leaves are placed into the tank with the outlet tubes of alternate leaves at opposite sides of the tank, vertical guides on the inner sides of the tank being employed to locate the outlet tubes laterally along the walls. The relatively thin, vertical end edge of one leaf is engaged between the outlet tubes of the two adjacent leaves in side-by-side relationship with a spacing between the leaves determined by the amount by which the outlet tube diameter exceeds the lateral thickness of the leaf itself.

A closed clear acrylic header tank or manifold is located at the outer side of each of two opposed sidewalls of the main tank of the filter. Receiving tubes opening into the interior of the header tank project upwardly through the upper wall of the header tanks and are located to be in alignment with the respective outlet tubes of the filter leaves at that particular side of the tank. The individual outlet tubes of the leaves and the associated receiving tube of the adjacent header tank are detachably coupled to each other by an open-ended coupling tube of inverted U-shaped configuration. The opposed ends of the U-shaped coupling tube are dimensioned to slidably fit into the upper ends of a filter leaf outlet tube and its associated receiving tube to thus place the interior of the header in fluid communication with the outlet tube of the leaf. A suction pump is connected to each header to establish fluid flow of filtrate from the leaves through the outlet tube, coupling tube and header to a collection point. The effluent from each individual leaf can be continuously visually monitored through the clear acrylic tank walls.

The individual leaves may easily be removed and replaced simply by manually lifting the coupling tube to slip it off the outlet tube of the leaf and the receiving tube of the header, at which time the leaf is available for manual removal. The leaves which remain in the tank are laterally stabilized by the guides on the tank wall so that the leaves at opposite sides of the space from which the leaf is removed remain in position to guide the replacement leaf into position. The coupling tube is then replaced.

The conduits connecting the header to the suction pump opens into the bottom of the header tank; hence suction is maintained even though one of the header tubes is open.

Other objects and features of the invention will become apparent by reference to the following specification and to the drawings.

IN THE DRAWINGS

DESCRIPTION OF THE PREFERRED EMBODIMENT

Figure 1:
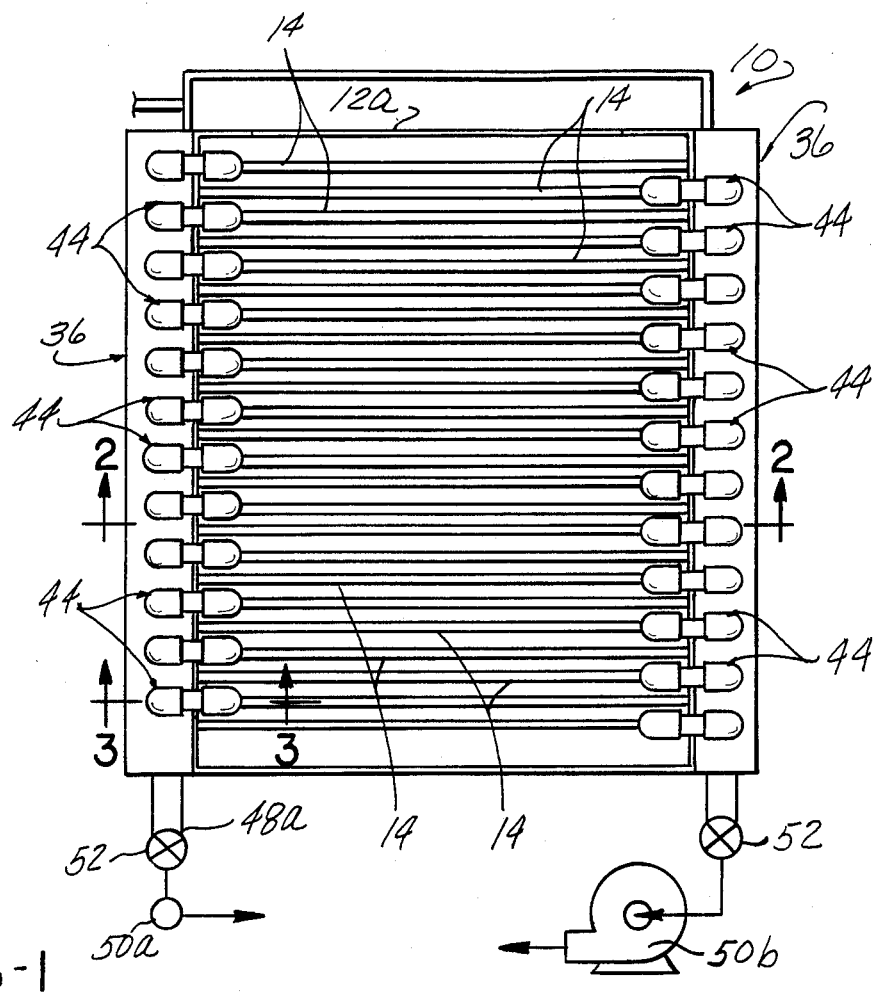
FIG. 1 is a top plan view, partially schematic, of a leaf filter system embodying the present invention.
Figure 2:
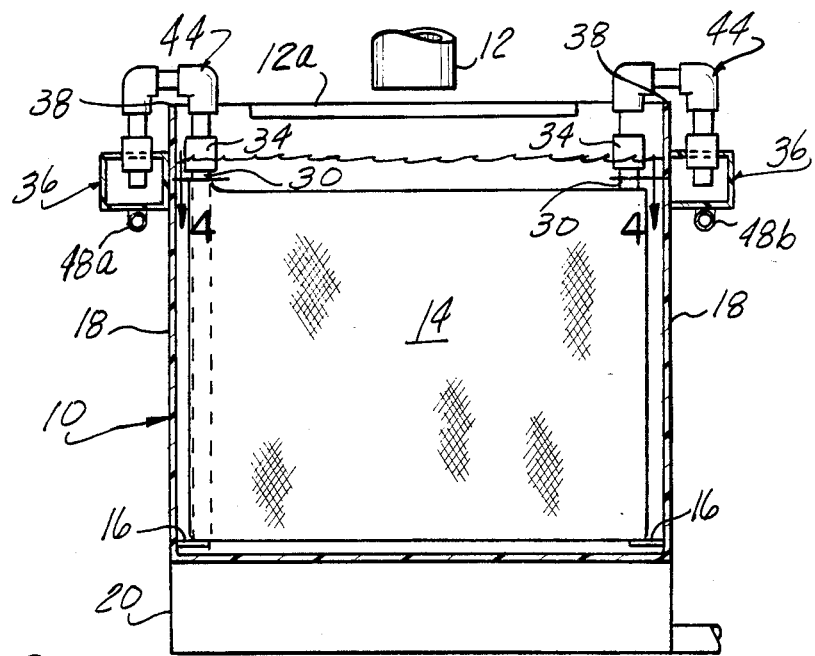
FIG. 2 is a cross-sectional view of the system of FIG. 1 taken on the line 2—2 of FIG. 1.

Referring first to FIGS. 1 and 2, a leaf filter system embodying the present invention includes a rectangular, open-topped main tank designated generally 10 into which fluid to be filtered is discharged from an inlet pipe partially indicated at 12 or alternately via an overflow weir 12a. A plurality of individual filter leaves designated generally 14 of rectangular configuration are located within tank 10 and supported at their lower corner edges as by shelves 16 fixedly mounted on the interior of two opposed sidewalls 18 of tank 10. The lower edges of leaves 14 are supported by shelves 16 in spaced relationship above the blottom of tank 10 by a distance which is dependent upon the type of impurities or solid particles which are to be separated from the incoming fluid by the filter system. Impurities or particles which are not retained on the filter leaves themselves as cake will settle to the bottom of tank 10 and some means for removing these particles, such as a commercially available sludge conveyor schematically indicated at 20, is usually provided. The particular removal means may take any of several conventional forms and does not, per se, form any part of the present invention.

Figure 3:
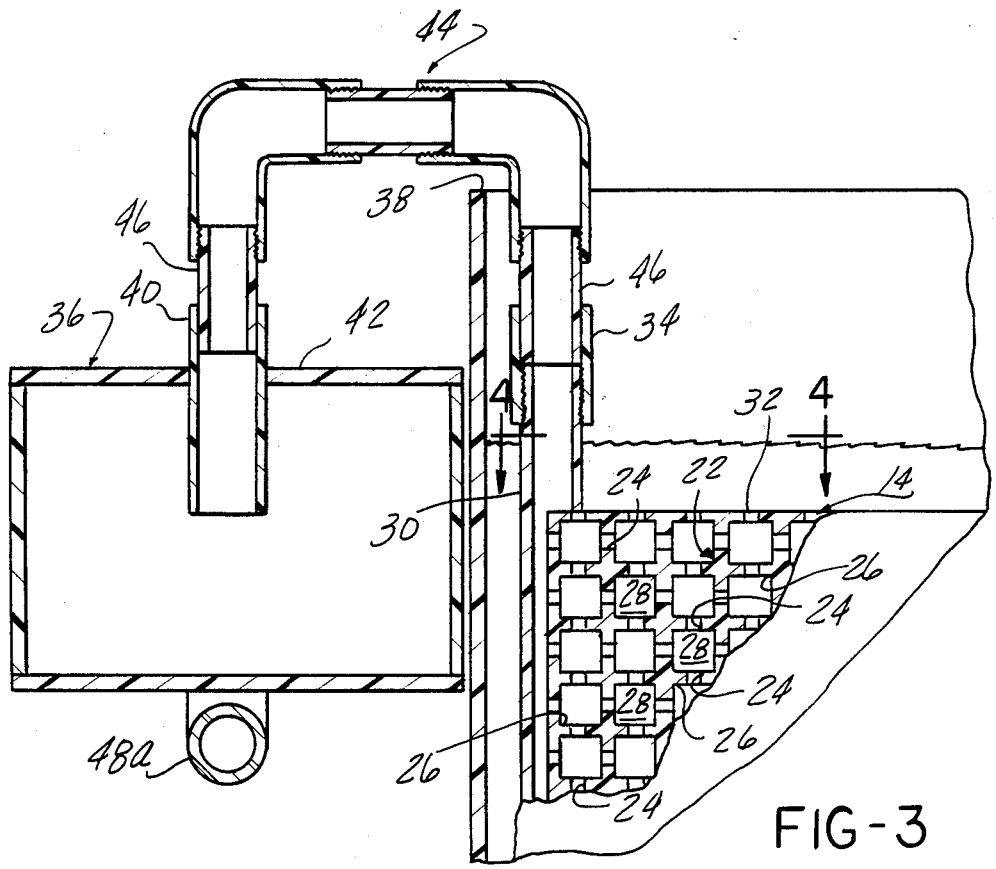
FIG. 3 is a detail, cross-sectional view taken on the line 3—3 of FIG. 1.

Referring now to FIG. 3, each filter leaf is constructed with a honeycomb-like core designated generally 22 with all of the individual "cells" of the honeycomb in fluid communication with each other, as by openings 24 in the webs 26 of the core. All of the individual cells also open outwardly at opposite sides of the core as at 28. For further details of this particular type of core construction, reference may be had to my aforementioned co-pending application Ser. No. 460,288.

Figure 4:
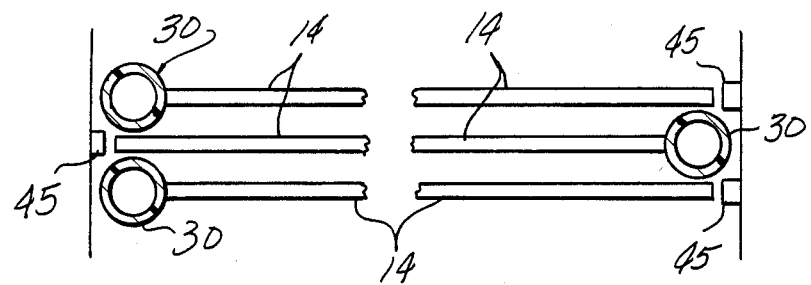
FIG. 4 is a partial, cross-sectional view, with certain parts broken away or omitted, showing the orientation of the leaves relative to each other.

As best seen in FIG. 2, the core 26 is of generally rectangular configuration and, as best seen in FIGS. 1 and 4, is of relatively narrow lateral thickness.

Returning to FIG. 3, one vertical end edge of core 22 projects through the wall of an outlet tube 30 and is fixedly mounted to the tube, as by adhesive bonding, with the honeycomb cells of core 22 in communication with the interior of outlet tube 30 via various openings 24. The exterior surfaces of core 22 and outlet tube 30 are tightly enshrouded by a filter medium 32 which, dependent upon the particular filtering operation, may be a mesh of cloth, paper or porous membrane or combination thereof. Each filter element weighs less than one pound per square foot of filtering area.

The filter medium 32 accommodates flow of filtrate from main tank 10 into the honeycomb cells defined by the leaf core 22, while contaminant particles or impurities are blocked from passage into the cells by the filter medium 32.

During normal operation of the filter, the level of fluid to be filtered maintained in tank 10 is kept at a level at which filter leaves 14 are completely submerged, but at a level at which the upper end of outlet tube 30, which is defined by a collar 34, projects upwardly above the surface of the fluid.

A pair of closed header tanks 36 are located respectively on the outer sides of each of sidewalls 18 to extend horizontally along the sidewall near the upper edge 38 of the respective sidewalls. Header tanks 36 are normally supported independently from the tank but may, if desired, be mounted directly upon the tank wall. A plurality of open-ended receiving tubes 40 are fixedly mounted in and project vertically through the upper wall 42 of the header tanks, the tubes 40 preferably being of the same diameter as the collar 34 on the leaf outlet tubes. During operation of the filter, each outlet tube 30 of a filter leaf is placed in fluid communication with a receiving tube 40 by a coupling tube designated generally 44 of inverted U-shaped configuration. As best seen in FIG. 3, the opposite end portions 46 of coupling tube 44 are of an outer diameter such that they can be telescopically received within a collar 34 and receiving tube 40 as shown in FIG. 3 with a smooth sliding fit. The fit is selected to be such as to provide a reasonable seal while at the same time accommodating, with minimal resistance, manual withdrawal of coupling tube 30 from the outlet tube collar and receiving tube.

It is believed apparent from the foregoing that an individual leaf is replaced simply by lifting its U coupling tube 44 clear of the receiving and leaf outlet tube, removing the leaf by lifting it out of the tank, inserting a new leaf in the tank and reconnecting the U coupling tube.

As best seen in FIG. 4, the filter leaves 14 are positioned within tank 10 with the outlet tube 30 of adjacent tubes being located at opposite sides of the tank. The diameter of the outlet tubes 30 is greater than the lateral width of the main leaf 14; hence when the leaves are arranged in this type of side-by-side relationship, the main rectangular portions of the leaves 14 are held in parallel, spaced, side-by-side relationship by the side-by-side engagement of the leaves and outlet tubes illustrated in FIG. 4. Vertical guide strips 45 on sidewalls 18 (FIG. 4) are employed to laterally locate the outlet tubes along the sidewall.

As best seen in FIG. 1, the header tanks 36 are connected by outlet conduits 48a and 48b located at the bottom of the respective tanks to separate suction pumps 50a and 50b which establishe a suction head sufficient to maintain a desired flow of filtrate out of tank 10 via the filter leaves in the face of the incoming flow of fluid to be filtered from the inlet pipe 12 or weir 12a. Valves 52 are provided in each conduit 48a and 48b so that the associated header tank may be shut off from pump 50a and 50b if several leaves connected to that header tank are to be replaced. When one of the valves 52 is closed and the other remains opened, those leaves still connected to suction pump 50a or 50b tend to withdraw particles from the filter media of the inactive leaves. Isolation of one set of leaves from the suction pump by closure of the associated valve 52 also provides the opportunity for backwashing the isolated leaves. The outlet conduits 48 may, if desired, be connected to a single pump 50.

Preferably, backwashing is accomplished by pulses of high pressure air or water directed to the interior of the filtering leaves. Alternatively, direct pressurized water between each filtering leaf may be used to clean the outside surface of the filtering medium.

By locating the outlet tubes 48 at the bottom of the header tanks 36, the suction head is normally maintained within the tank for the short time a coupling tube 44 is removed to permit a leaf to be withdrawn from the tank. The opening of one of the header receiving tubes by the removal of its coupling tube may vent the head space in the tank if the fluid level drops below the bottom of the receiving tube while the coupling tube is disconnected, but the fluid level normally will not fall to the bottom of the tank. If desired, the top of the receiving tube may be covered with a cap or the operator's hand until the coupling tube is reconnected.

The assembly of filter leaves while in communication with their associated header tanks can be removed as an assembled unit from tank to tank or may even be suspended on pontoons in a large body of water to be filtered.

While one embodiment of the invention has been described in detail, it will be apparent to those skilled in the art the disclosed embodiment may be modified. Therefore, the foregoing description is to be considered exemplary rather than limiting, and the true scope of the invention is that defined in the following claims.

I claim:

1. In a leaf-type filter including a main tank for receiving fluid to be filtered, said tank having a sidewall terminating at a horizontal upper edge and an outlet in its bottom for conducting separated particles from said tank, a plurality of filter leaves located in said tank to be immersed in fluid to be filtered, each leaf having an internal chamber having inlet openings covered by a filter media and a filtrate outlet, suction pump means, and fluid conduit means for connecting said pump means to the outlets of said filter leaves to withdraw filtered fluid from the internal chambers of said leaves;

the improvement wherein each of said leaves comprises a vertically extending outlet tube in fluid communication with its chamber and having an open upper end constituting the outlet of the chamber, said leaves being disposed within said tank with the outlet tubes of said leaves extending upwardly along said sidewall in spaced, side-by-side relationship with the upper ends of said outlet tubes being located adjacent said upper edge, and said conduit means comprises a plurality of fluid receiving tubes, one for each outlet tube fixedly mounted in spaced, side-by-side relationship upon the outer side of said sidewall, said receiving tubes having open upper ends located adjacent said upper edge, a like plurality of generally U-shaped fluid coupling tubes, the opposite ends of each coupling tube being respectively slidably and telescopically receivable with the upper ends of a receiving tube and an outlet tube to establish a fluid passage between the two last-mentioned tubes.

2. The invention defined in claim 1 wherein the outer diameter of the opposite ends of a coupling tube are substantially equal to the respective inner diameters of said receiving and outlet tubes to accommodate a smooth sliding fit of the ends of the coupling tube within the upper ends of the receiving and outlet tubes.

3. The invention defined in claim 1 or claim 2 wherein said conduit means further comprises a closed second tank located at the outer side of said sidewall and extending along said sidewall adjacent said upper edge, said receiving tubes being mounted on said second tank in fluid communication with the interior thereof and projecting upwardly from said second tank, and means placing the interior of said second tank in fluid communication with the intake of said suction pump means.

4. The invention defined in claim 3 further comprising valve means for selectively connecting or disconnecting the suction pump means and second tank.

5. The invention defined in claim 1 wherein said filter leaves are of rectangular configuration, the outlet tube of each leaf defining one vertical end edge of the leaf and projecting upwardly above the horizontal upper edge of the leaf, the outlet tube having a diameter greater than the lateral thickness of the leaf whereby said leaves may be disposed in parallel, side-by-side relationship within said tank with the outlet tubes of adjacent leaves located adjacent opposite sidewalls of said tanks with the vertical end edge of a leaf remote from its coupling tube being disposed between the coupling tubes of the two adjacent leaves, and means on the inner side of each of said opposite sidewalls defining a shelf on each sidewall for supporting the horizontal lower edges of said leaves in spaced relationship above the bottom of said tank.

6. The invention defined in claim 5 wherein said conduit means further comprises a pair of closed second tanks, one located at the outer side of each of said opposite sidewalls, means on each of said tanks mounting a plurality of said receiving tubes on the tank with the receiving tubes in fluid communication with the interior of the tank on which they are mounted and with the receiving tubes projecting upwardly from the tank to a location adjacent the upper edge of the adjacent sidewall, and outlet conduit means placing the interiors of said second tanks in fluid communication with said suction pump means.

7. The invention defined in claim 6 further comprising shut-off valve means in each of said second conduits.

* * * * *